United States Patent
Brown et al.

(10) Patent No.: US 8,838,815 B2
(45) Date of Patent: Sep. 16, 2014

(54) SYSTEMS AND METHODS TO MAKE A RESOURCE AVAILABLE VIA A LOCAL NETWORK

(75) Inventors: William A. Brown, Woodstock, GA (US); Troy Meuninck, Newnan, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1037 days.

(21) Appl. No.: 12/474,748

(22) Filed: May 29, 2009

(65) Prior Publication Data

US 2010/0306394 A1 Dec. 2, 2010

(51) Int. Cl.
| | |
|---|---|
| G06F 15/16 | (2006.01) |
| G06F 15/167 | (2006.01) |
| G06F 15/173 | (2006.01) |
| H04L 29/08 | (2006.01) |
| H04N 21/41 | (2011.01) |
| H04N 21/436 | (2011.01) |
| H04L 29/06 | (2006.01) |

(52) U.S. Cl.
CPC ............... H04L 67/16 (2013.01); H04L 63/08 (2013.01); H04L 63/101 (2013.01); H04N 21/4126 (2013.01); H04L 63/0492 (2013.01); H04N 21/43615 (2013.01)
USPC ........... 709/229; 709/201; 709/203; 709/213; 709/217; 709/218; 709/219; 709/223; 709/225; 709/231

(58) Field of Classification Search
USPC ......... 709/201, 203, 213, 217–219, 223, 225, 709/229, 231
See application file for complete search history.

(56) References Cited

U.S. PATENT DOCUMENTS

| | | | | |
|---|---|---|---|---|
| 5,737,523 | A * | 4/1998 | Callaghan et al. | 726/21 |
| 6,253,236 | B1 * | 6/2001 | Troxel et al. | 709/217 |
| 6,519,647 | B1 * | 2/2003 | Howard et al. | 709/229 |
| 6,604,140 | B1 * | 8/2003 | Beck et al. | 709/226 |
| 7,290,278 | B2 * | 10/2007 | Cahill et al. | 726/6 |
| 7,324,972 | B1 * | 1/2008 | Oliver et al. | 705/40 |
| 7,395,318 | B2 * | 7/2008 | Blawat et al. | 709/219 |
| 7,398,318 | B2 * | 7/2008 | McIntyre | 709/229 |
| 7,424,550 | B2 * | 9/2008 | Davis et al. | 709/245 |
| 7,613,428 | B2 * | 11/2009 | Blight et al. | 455/41.2 |
| 7,620,685 | B2 * | 11/2009 | Marcjan | 709/204 |
| 7,631,089 | B2 * | 12/2009 | Knauerhase et al. | 709/229 |
| 7,653,733 | B2 * | 1/2010 | Beyda | 709/229 |
| 7,716,350 | B2 * | 5/2010 | Howarth et al. | 709/229 |
| 7,734,700 | B2 * | 6/2010 | Johns et al. | 709/206 |

(Continued)

OTHER PUBLICATIONS

Kaushik Veeraraghavan and Andrew Myrick and Jason Flinn, "Cobalt: Separating content distribution from authorization in distributed file systems", Jan. 3, 2007, Proceedings of the 5th USENIX Conference on File and Storage Technologies, pp. 231-244.*

*Primary Examiner* — Tauqir Hussain
*Assistant Examiner* — Angela Widhalm
(74) *Attorney, Agent, or Firm* — Toler Law Group, PC

(57) ABSTRACT

Methods and systems for making a resource available are disclosed. In a particular method, identification information associated with a portable device within a particular coverage area is received. A resource associated with the portable device is determined based on the identification information. An authentication message identifying the resource to a device is sent. Access control information is received from the device. The access control information indicates that access to the resource should be enabled via a local network. The resource is made available via the local network.

20 Claims, 4 Drawing Sheets

(56) References Cited

U.S. PATENT DOCUMENTS

| | | | |
|---|---|---|---|
| 7,769,903 B2 * | 8/2010 | Robbin et al. | 709/248 |
| 7,770,229 B2 * | 8/2010 | Upendran | 726/30 |
| 7,783,698 B2 * | 8/2010 | Jain | 709/203 |
| 7,836,487 B2 * | 11/2010 | Walker Pina et al. | 726/3 |
| 7,895,317 B2 * | 2/2011 | Gingell et al. | 709/224 |
| 7,949,770 B2 * | 5/2011 | Kawabata et al. | 709/229 |
| 8,375,128 B2 * | 2/2013 | Tofighbakhsh et al. | 709/226 |
| 8,732,319 B2 * | 5/2014 | Tian | 709/228 |
| 2002/0199203 A1 | 12/2002 | Duffy | |
| 2003/0014333 A1 * | 1/2003 | Brown | 705/28 |
| 2004/0006621 A1 * | 1/2004 | Bellinson et al. | 709/225 |
| 2004/0139202 A1 * | 7/2004 | Talwar et al. | 709/229 |
| 2004/0175098 A1 | 9/2004 | Calhoon | |
| 2004/0260811 A1 * | 12/2004 | Cherkasova | 709/225 |
| 2005/0076127 A1 * | 4/2005 | Wilson et al. | 709/227 |
| 2005/0114530 A1 * | 5/2005 | Mangalik et al. | 709/229 |
| 2005/0210101 A1 | 9/2005 | Janik | |
| 2006/0166740 A1 | 7/2006 | Sufuentes | |
| 2007/0033607 A1 | 2/2007 | Bryan | |
| 2007/0083915 A1 * | 4/2007 | Janakiraman et al. | 726/4 |
| 2007/0156805 A1 | 7/2007 | Bristol | |
| 2007/0217436 A1 | 9/2007 | Markley | |
| 2007/0299976 A1 * | 12/2007 | Zafar et al. | 709/229 |
| 2008/0092181 A1 | 4/2008 | Britt | |
| 2008/0178238 A1 | 7/2008 | Khedouri | |
| 2008/0195621 A1 | 8/2008 | Tedesco | |
| 2008/0221715 A1 | 9/2008 | Krzyzanowski | |
| 2008/0242221 A1 | 10/2008 | Shapiro | |
| 2008/0287094 A1 | 11/2008 | Keeler | |
| 2008/0317441 A1 | 12/2008 | Calhoon | |
| 2009/0031033 A1 * | 1/2009 | Deng et al. | 709/229 |
| 2009/0097459 A1 * | 4/2009 | Jendbro et al. | 370/338 |
| 2009/0132718 A1 * | 5/2009 | Groll et al. | 709/229 |
| 2009/0165123 A1 * | 6/2009 | Giobbi | 726/19 |
| 2010/0192183 A1 * | 7/2010 | Hu | 725/62 |
| 2010/0235881 A1 * | 9/2010 | Liu et al. | 726/3 |
| 2010/0268779 A1 * | 10/2010 | Rao | 709/206 |
| 2010/0297946 A1 * | 11/2010 | Alameh et al. | 455/41.3 |

\* cited by examiner

SYSTEMS AND METHODS TO MAKE A RESOURCE AVAILABLE VIA A LOCAL NETWORK

FIELD OF THE DISCLOSURE

The present disclosure is generally related to making resources available via a local network.

BACKGROUND

Many consumers have numerous multimedia resources in their home. These multimedia resources may include, for example, access to a service-provider system, such as an Internet Protocol television (IPTV) system or a Cable television (CATV) system. Other multimedia resources may include devices, such as personal computers, video recorders, telephones, and cameras, for example. Consumers may desire to share multimedia content between different devices in their own home or share multimedia content with a resource or device of another consumer's home.

DETAILED DESCRIPTION

Systems and methods for making resources available at a local network are disclosed. In a first particular embodiment, a method for making a resource available via a local network includes receiving identification information associated with a portable device within a coverage area associated with a local network. The method also includes determining a resource associated with the portable device based on the identification information. An authentication message is sent to identify the resource to a device. The method includes receiving access control information from the device. The access control information indicates that access to the resource should be enabled via the local network.

In a second particular embodiment, a computer-readable storage medium for making a resource available at a local network is disclosed. The computer-readable storage medium includes computer-executable instructions that, when executed by a processor, cause the processor to receive identification information associated with a portable device within a coverage area associated with a local network. The computer-executable instructions also cause the processor to determine a resource associated with the portable device based on the identification information. The computer-executable instructions also cause the processor to send an authentication message identifying the resource to a device. The computer-executable instructions cause the processor to receive access control information from the device. The access control information indicates that access to the resource should be enabled via the local network.

In a third particular embodiment, a computing device for making a resource available is disclosed. The computing device includes a network interface, a proximity detector, and a gateway module coupled to the proximity detector. During operation, the network interface enables communication via a network. The proximity detector determines whether a portable device is located within a coverage area associated with the computing device. The gateway module communicates with the portable device when the portable device is located within the coverage area to determine identification information associated with the portable device. The gateway module sends the identification information associated with the portable device to a resource manager via the network. The gateway module receives an authentication message from the resource manager. The authentication message identifies a resource associated with the portable device. The gateway module sends access control information to the resource manager. The access control information indicates that access to the resource should be enabled at the computing device.

Figure 1:
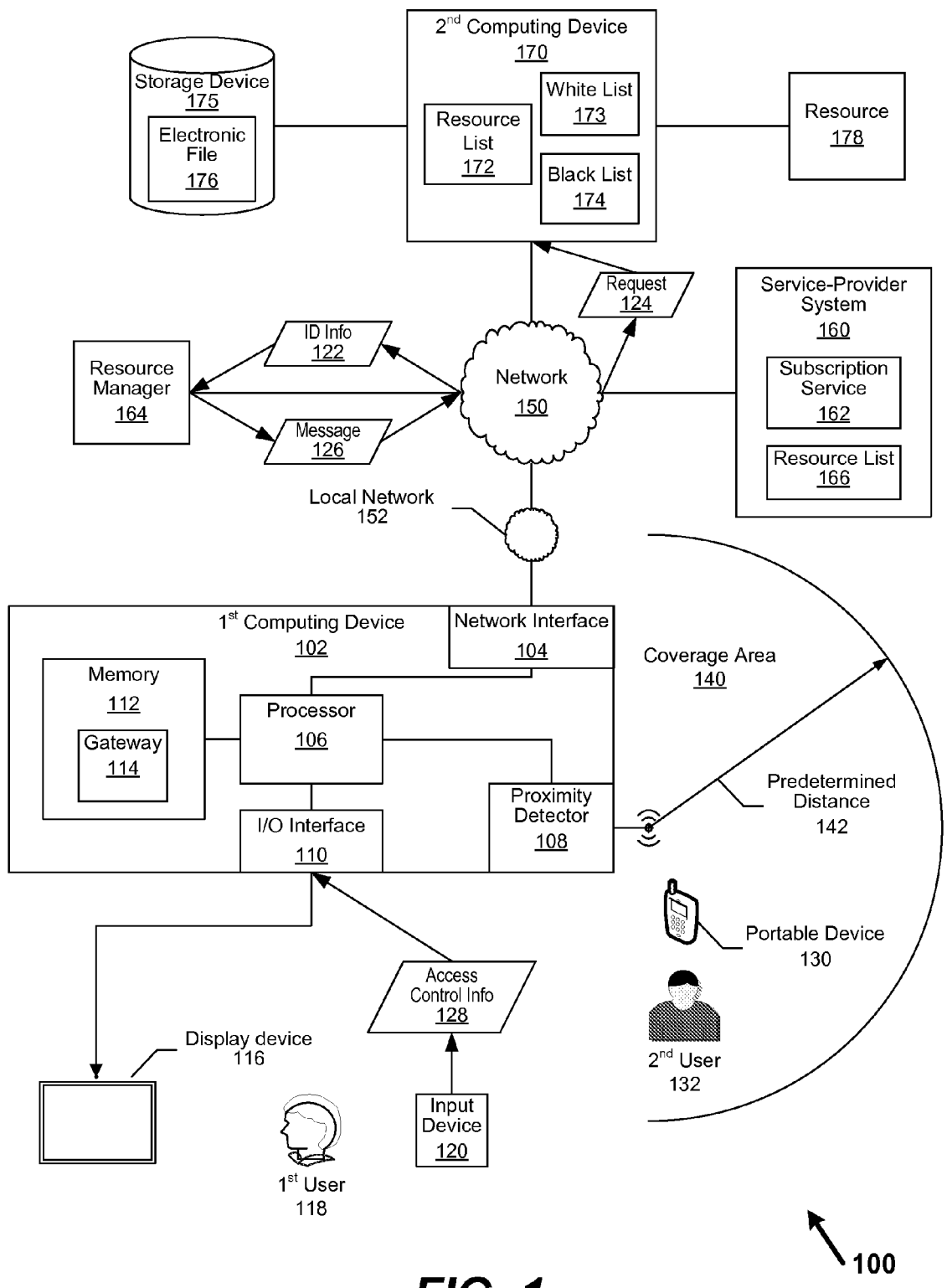
FIG. 1 is an illustration of a particular embodiment of a system to make a resource available at a local network.

Referring to FIG. 1, an illustrative embodiment of a system 100 to make a resource available at a local network 152 is disclosed. The system 100 includes a first computing device 102 connected to a network 150. For example, the first computing device 102 may be coupled to the network 150 via the local network 152. In another example, the first computing device 102 may be a gateway device located between the local network 152 and the network 150. The network 150 provides the first computing device 102 with access to a resource manager 164, a service-provider system 160, and a second computing device 170. The first computing device 102 is also connected to a display device 116. The first computing device 102 can communicate with an input device 120. The local network 152 may also include or be coupled to other devices, such as other computing devices, for example. The first computing device 102 may include a set-top box, a personal computer, a router, a gateway device, another computing device, or any combination thereof.

The system 100 also includes resources associated with a portable device 130. For example, the second computing device 170 is a resource that is associated with the portable device 130. To illustrate, the second computing device 170 and the portable device 130 may both be owned by a second user 132. The second computing device 170 may be located at a residence or other location associated with the second user 132. In a first particular embodiment, the second computing device 170 is a set-top box. In a second particular embodiment, the second computing device 170 is a personal computer. The second computing device 170 includes a resource list 172 including a list of resources associated with the portable device 130. The second computing device 170 includes a white list 173 and a black list 174. The white list 173 specifies resources associated with the portable device 130 that may be made available or should be made available under specified circumstances. The black list 174 specifies resources associated with the portable device 130 that should not be made available or should not be made available under specified circumstances. The system 100 includes a storage device 175 accessible to the second computing device 170. The storage device 175 is a resource associated with the portable device 130. The storage device 175 includes an electronic file 176 that is also a resource associated with the portable device 130. The electronic file 176 may include multimedia content, for example. The system 100 may include additional resources associated with the portable device 130. For example, the system 100 includes a representative resource 178, such as a camera, a gaming device, another electronic device accessible by the second computing device 170 accessible by or the resource manager 164.

In particular embodiments, a service-provider system 160 includes resources associated with the portable device 130.

The service-provider system 160 may include an Internet Protocol television (IPTV) system, a cable television (CATV) system, another on-demand, pay-per-view, or subscription media access provider system, or any combination thereof. The service-provider system 160 includes a subscription service 162 that may also be a resource associated with the portable device 130. The subscription service 162 may provide multimedia content to the second computing device 170, such as premium television channels, pay-per-view programs, or other subscription or on-demand content. In a first particular embodiment, the subscription service 162 may provide multimedia content to the first computing device 102 in addition to providing multimedia content to the second computing device 170. In a particular embodiment, the service-provider system 160 may include the resource manager 164.

The first computing device 102 includes a network interface 104 that enables the first computing device 102 to connect to the network 150, providing the first computing device 102 with access to the resource manager 164, the service-provider system 160, and the second computing device 170. The first computing device 102 also includes a processor 106, a proximity detector 108, an input/output (I/O) interface 110, and a memory 112. The network interface 104, the I/O interface 110, and the memory 112 may be coupled to or otherwise accessible to the processor 106.

The proximity detector 108 may be configured to determine whether a portable device, such as the portable device 130, is located within a coverage area 140 of the first computing device 102. The portable device 130 may be a mobile telephony device, a personal digital assistant, a key fob, a portable computer, or any combination thereof. In particular embodiments, the proximity detector 108 is configured to determine whether the portable device 130 is located within a predetermined distance 142 of the first computing device 102. If the portable device 130 is located within the predetermined distance 142 of the first computing device 102, the portable device 130 is considered to be located in the coverage area 140 of the first computing device 102. The predetermined distance 142 may be a distance from the proximity detector 108 where the portable device 130 may communicate with the proximity detector 108. Thus, in particular embodiments, if the proximity detector 108 can communicate with the portable device 130, then the portable device 130 is considered to be within the coverage area 140 of the first computing device 102. For example, the predetermined distance 142 may indicate that the portable device 130 is in the same room (e.g., the predetermined distance 142 may be less than about 15 feet). As another example, the predetermined distance 142 may indicate that the portable device 130 is in the same residence as the first computing device 102 (e.g., the predetermined distance 142 may be less than about 50 feet). Additionally, the predetermined distance 142 may indicate that the portable device 130 is very close to the first computing device 102 (e.g., the predetermined distance 142 may be a few inches). In a particular embodiment, the first user 118 may customize the predetermined distance 142. The first user 118 may customize the predetermined distance 142 by adjusting a maximum range at which the proximity detector 108 is enabled to communicate with a portable device. The predetermined distance 142 may be stored locally in and retrieved from the memory 112. Alternatively, the predetermined distance 142 may be retrieved via the network 150. In a particular embodiment, the proximity detector 108 uses wireless communications to determine whether the portable device 130 is located within the coverage area 140 of the first computing device 102. Examples of short-range, high-frequency, wireless communications are sometimes referred to as Near Field Communication (NFC) technology. In a particular embodiment, the proximity detector 108 uses a frequency-hopping-spread-spectrum radio signal to determine whether the portable device 130 is located within the predetermined distance 142 of the first computing device 102. For example, the frequency-hopping-spread-spectrum radio technology may include Bluetooth™ technology. In particular embodiments, the proximity detector 108 uses a communication technology based on IEEE 802.11 standards, such as Wi-Fi devices and wireless LAN devices.

The memory 112 includes a gateway module 114. The gateway module 114 includes computer-executable instructions that, when executed by the processor 106, cause a resource associated with the portable device 130 to be made available to the local network 152. The resource manager 164 may include computer-executable instructions that, when executed by a processor, cause a resource associated with the portable device 130 to be made available to the local network 152.

During operation, the proximity detector 108 may determine that the portable device 130 is located within the coverage area 140 of the first computing device 102. For example, a second user 132 may bring the portable device 130 into the residence of the first user 118. When the proximity detector 108 determines that the portable device 130 is located within the coverage area 140, the gateway module 114 may communicate with the portable device 130 to determine identification information associated with the portable device 130. The identification information may include a name or other identifier of an owner of the portable device 130 (e.g., the second user 132), an account number associated with the portable device 130, a phone number associated with the portable device 130, another identifier associated with the portable device 130 (e.g., a uniform resource locator (URL) or a product serial number), or any combination thereof. In particular embodiments, the identification information includes a URL associated with a device or system that includes a list of resources associated with the portable device 130. For example, the identification information may include a URL associated with the second computing device 170 or the service-provider system 160. In other embodiments, the identification information includes information identifying a particular resource that may be made available at the first computing device 102 and an identifier of a device or system that is enabled to provide the particular resource. The device or system that is enabled to provide the particular resource may be the second computing device 170, the storage device 175, the service-provider system 160, or another resource 178. After the gateway module 114 communicates with the portable device 130 and determines identification information associated with the portable device 130, the first computing device 102 may send identification information 122 to the resource manager 164.

The resource manager 164 may determine a resource associated with the portable device 130 based on the identification information 122. In particular embodiments, the resource manager 164 sends a request 124 to the second computing device 170, requesting a list of resources 172 associated with the portable device 130. The second computing device 170 may determine whether each resource listed in the list of resources is included in the white list 173. A resource being listed in the white list 173 indicates that the resource has been pre-approved to be shared when a request to share the resource is received based on proximity the portable device 130 to a device or system capable of accessing the resource (such as the first computing device 102). Thus, when a resource is included in the white list 173, the resource may be made available at the local network 152 without awaiting further approval from the second user 132. Additionally, the second computing device 170 may determine whether each resource listed in the list of resources 172 is not included in the black list 174. A resource being listed in the black list 174 indicates that the resource has been blocked from being shared, at least under certain specified circumstances. The black list 174 may specify that the resource may not be shared with certain specific devices (such as, the first computing device 102); may not be shared with devices associated with certain networks (such as, the local network 152); may not be shared at certain times; may never be shared; may not be shared based on other features of the first user 118, the local network 152, the first computing device 102; or any combination thereof. When a resource in the list of resources 172 is included in the black list 174, the resource may not be made available at the local network 152. Thus, the resource manager 164 may retrieve the list of resources 172 from the second computing device 170 when the resources is on the white list 173. In other particular embodiments, the resource manager 164 communicates with the service-provider system 160 to identify a resource associated with the portable device 130. For example, the resource manager 164 may send the request 124 to the service-provider system 160 and may retrieve a list of resources 166 from the service-provider system 160.

The resource manager 164 may send a confirmation-request message to the portable device 130. The confirmation-request message may include a request for confirmation that access to a particular resource should be enabled at the local network 152. In particular embodiments, the confirmation-request message identifies a plurality of resources associated with the portable device 130 and the resource manager 164 receives a response message to the confirmation-request message that includes information selecting the particular resource to be enabled at the local network 152. The resource manager 164 may send a confirmation-request message to the service-provider system 160, the message including a request for the service-provider system 160 to obtain confirmation from the portable device 130 that access to the resource should be enabled at the local network 152.

The resource manager 164 may send an authentication message 126 to a device, such as the first computing device 102 or another device, coupled to the local network 152, identifying at least one resource that is associated with the portable device 130 that is to be enabled at the local network 152. In particular embodiments, the first user 118 designates a particular device at the local network 152 that will receive the authentication message 126. In particular embodiments, the device 152 that receives the authentication message 126 is the first computing device 102. The first computing device 102 may display at least a portion of the authentication message 126 at the display device 116. In particular embodiments, the first computing device 102 includes a set-top box configured to display the authentication message 126 at a television display coupled to the set-top box.

The first user 118 or the second user 132 may respond to the authentication message 126 by using the input device 120 to enter access control information 128 indicating that access to at least one resource should be enabled at the first computing device 102. The access control information 128 may include information, such as identifiers for the at least one resource to be enabled, a password, or a personal identification number (PIN). The first computing device 102 may send the access control information 128 to the resource manger 164 to indicate that access to the at least one resource should be enabled at the first computing device 102. The resource manager 164 may receive the access control information 128 and make the at least one resource available at the local network 152. Making the at least one resource available to the local network 152 may include, for example, downloading the electronic file 176 from the storage device 175 to the first computing device 102 at the local network 152. Making the at least one resource available to the local network 152 may also include, for example, providing the subscription service 162 to the first computing device 102 at the local network 152. In particular embodiments, the gateway module 114 is configured to make the at least one resource unavailable at the first computing device 102 when the portable device 130 leaves the coverage area 140 of the first computing device 102. In this manner, the first user 118 may have access to the at least one resource at the local network 152 only when the portable device 130 is within the coverage area 140. If, for example, the second user 132 leaves the coverage area 140 and takes the portable device 130 outside the coverage area 140 access to the at least one resource at the local network 152 could be disabled.

The second user 132 may have numerous resources that are normally available at the second user's 132 residence. The system 100 enables the second user 132 to share the resources with others while away from his residence. Thus, the second user 132 can share the resources with the first user 118 while the second user 132 is present at the residence of the first user 118. In a particular example, both the first computing device 102 and the portable device 130 are associated with the service provider system 160, and the service provider system 160 may include the resource manager 164 and the subscription service 162. In one example, the first user 118 is not a subscriber to the subscription service 162 and the second user 132 is a subscriber to the subscription service 162. Thus, the subscription service 162 is a resource associated with the portable device 130, that is owned by the second user 132. To illustrate, while visiting the first user 118, the second user 132 may suggest that particular multimedia content available via the subscription service 162 be viewed. Since the first user 118 is not a subscriber of the subscription service 162, the second user 132 may enable access to the subscription service 162 at the local network 152 based on the second user's subscription service 162. Thus, both the first user 118 and the second user 132 may view the particular multimedia content while the second user 132 is present, as indicated by presence of the portable device 130 within the coverage area 140.

Figure 2:
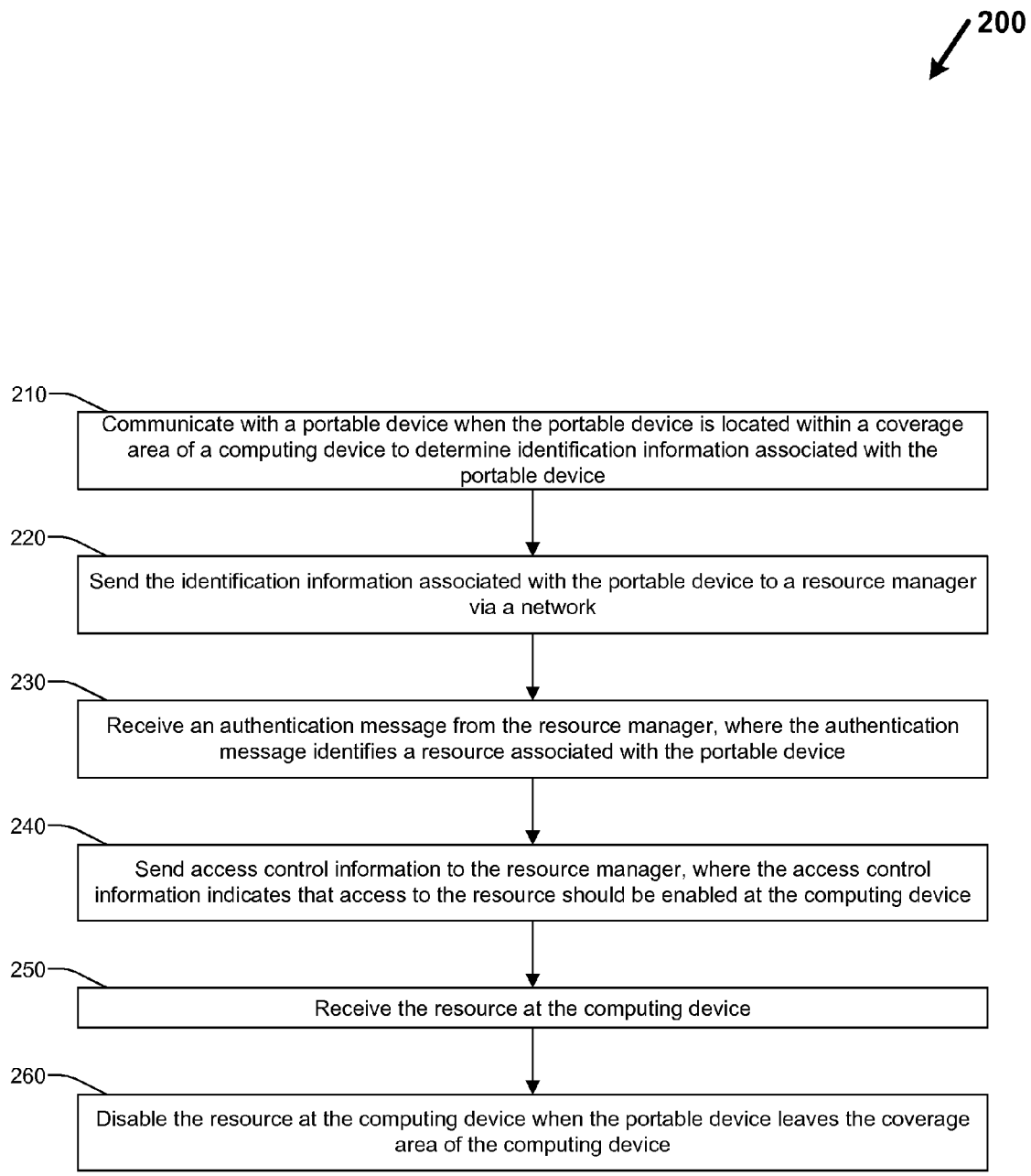
FIG. 2 is a flow chart of a first particular embodiment of a method for making a resource available at a local network.

Referring to FIG. 2, a flow chart 200 of a first particular embodiment of a method of making a resource available at a local network is disclosed. At 210, a computing device communicates with a portable device when the portable device is located within a coverage area of the computing device to determine identification information associated with the portable device. In particular embodiments, the computing device includes the first computing device 102 shown in FIG. 1. The computing device may include a set-top box, a personal computer, a router, a gateway device, another computing device, or any combination thereof. In particular embodiments, the portable device includes the portable device 130 shown in FIG. 1. For example, the portable device may include a mobile telephony device, a personal digital assistant, a key fob, a portable computer, or any combination thereof. In particular embodiments, the coverage area of the computing device includes the coverage area 140 of the first computing device 102 shown in FIG. 1. For example, the coverage area may include an area within a wireless communication range of the computing device. In particular embodiments, the identification information includes the identification information 122 shown in FIG. 1.

Advancing to 220, the method includes sending the identification information associated with the portable device to a resource manager via a network. The resource manager may include, for example, the resource manger 164 shown in FIG. 1 and the network may include, for example, the network 150 shown in FIG. 1. In particular embodiments, the network is an IPTV access network or a CATV network. In a particular embodiment, the resource manager uses the identification information to determine resources associated with the portable device that are available to be shared.

Advancing to 230, the method includes receiving an authentication message from the resource manager. The authentication message identifies at least one resource associated with the portable device. The authentication message may include, for example, the authentication message 126 shown in FIG. 1.

Access control information is sent to the resource manager, at 240. The access control information indicates that access to the resource should be enabled at the computing device. The access control information may include, for example, the access control information 128 shown in FIG. 1.

Advancing to 250, the method includes receiving the resource at the computing device. For example, the resource may include a premium channel from a subscription service that may be enabled for access at the computing device. In another example, the resource may include a file stored remotely, such as at a second computing device. To illustrate, the resource may include recorded media content or other data, such as is illustrated by the electronic file 176 shown in FIG. 1. The computing device may be enabled to access, download or utilize the recorded media content when the portable device is within the coverage area of the computing device. The resource is disabled at the computing device when the portable device leaves the coverage area of the computing device, at 260.

Figure 3:
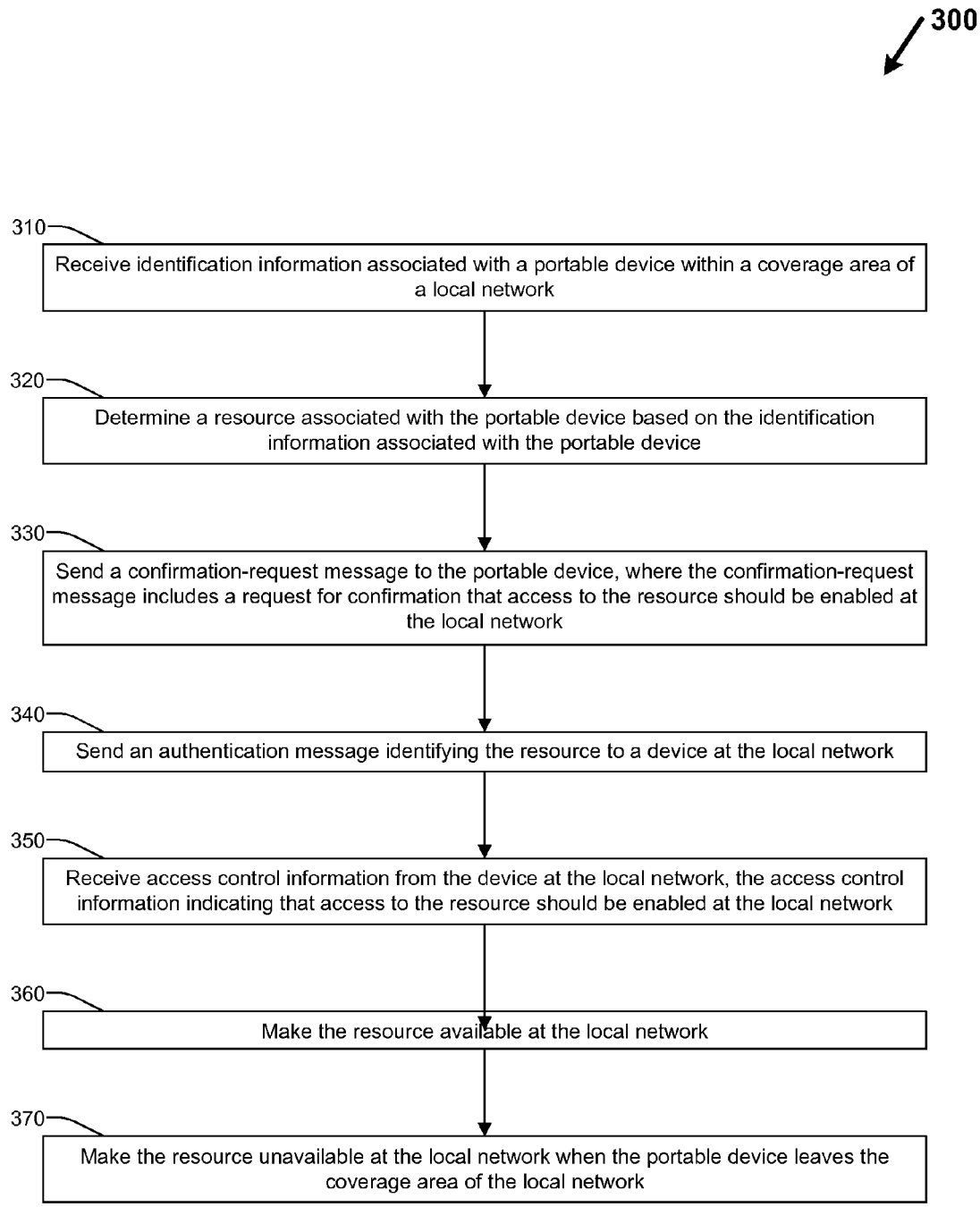
FIG. 3 is a flow chart of a second particular embodiment of a method for making a resource available at a local network.

Referring to FIG. 3, a flow chart 300 of a second particular embodiment of a method of making a resource available to a local network is disclosed. At 310, a computing device receives identification information associated with a portable device within a coverage area of a local network. In particular embodiments, the computing device includes the resource manager 164 shown in FIG. 1. In particular embodiments, the portable device includes the portable device 130 shown in FIG. 1. The portable device may include a mobile telephony device, a personal digital assistant, a key fob, a portable computer, or any combination thereof. The identification information may include the name or another identifier of an owner of the portable device, an account number associated with the portable device, a phone number associated with the portable device, another identifier associated with the portable device (e.g., a uniform resource locator (URL) or a product serial number), or any combination thereof.

Advancing to 320, the method includes determining a resource associated with the portable device based on the identification information associated with the portable device. The resource may include an electronic file, a subscription service, another electronic resource, or any combination thereof. For example, the resource may include a file stored on a remote computing device or other data storage device (such as a camera, a video game console, or a media recording device) located at a remote network associated with the portable device.

Advancing to 330, the method includes sending a confirmation-request message to the portable device. The confirmation-request message may include a request for confirmation that access to the resource should be enabled at the local network. For example, the confirmation-request message may include a message for display on a display device at the portable device prompting the user to enter input to confirm that the resource should be enabled at the local network. The confirmation-request message may serve as a security message to prevent a device at the local network from enabling access to the resource without the permission of the owner of the portable device that is associated with the resource. In particular embodiments, the confirmation-request message includes the confirmation-request message described with reference to FIG. 1.

Advancing to 340, the method includes sending an authentication message to a designated device at the local network. In particular embodiments, the designated device is the device that sent the identification information to the resource manager. In other particular embodiments, the designated device is a predetermined device. The authentication message may identify the resource to the device at the local network. In particular embodiments, the device at the local network includes the first computing device 102 shown in FIG. 1 The device at the local network may include a set-top box, a personal computer, a router, a gateway device, another computing device, or any combination thereof. In particular embodiments, the authentication message includes the authentication message shown in FIG. 1.

Advancing to 350, the method includes receiving access control information from the device at the local network. The access control information may include information used to make the resource available to the device at the local network. The access control information may include information, such as identifiers for the resource to be enabled, a password, a PIN, or any combination thereof. The device may send the access control information to the resource manger to indicate that access to the at least one resource should be enabled at the device at the local network. In particular embodiments, the access control information includes the access control information 128 shown in FIG. 1.

Advancing to 360, the method includes making the resource available at the local network. In a particular embodiment, making the resource available at the local network includes providing access to a premium channel from a subscription service. In another embodiment, making the resource available at the local network includes downloading or otherwise accessing an electronic file at the local network.

The resource is made unavailable at the local network when the portable device leaves the coverage area of the local network, at 370. For example, when the second user 132 shown in FIG. 1 leaves the coverage area 140 with the portable device 130, the first user 118 may no longer be provided access to resources associated with the portable device 130.

Figure 4:
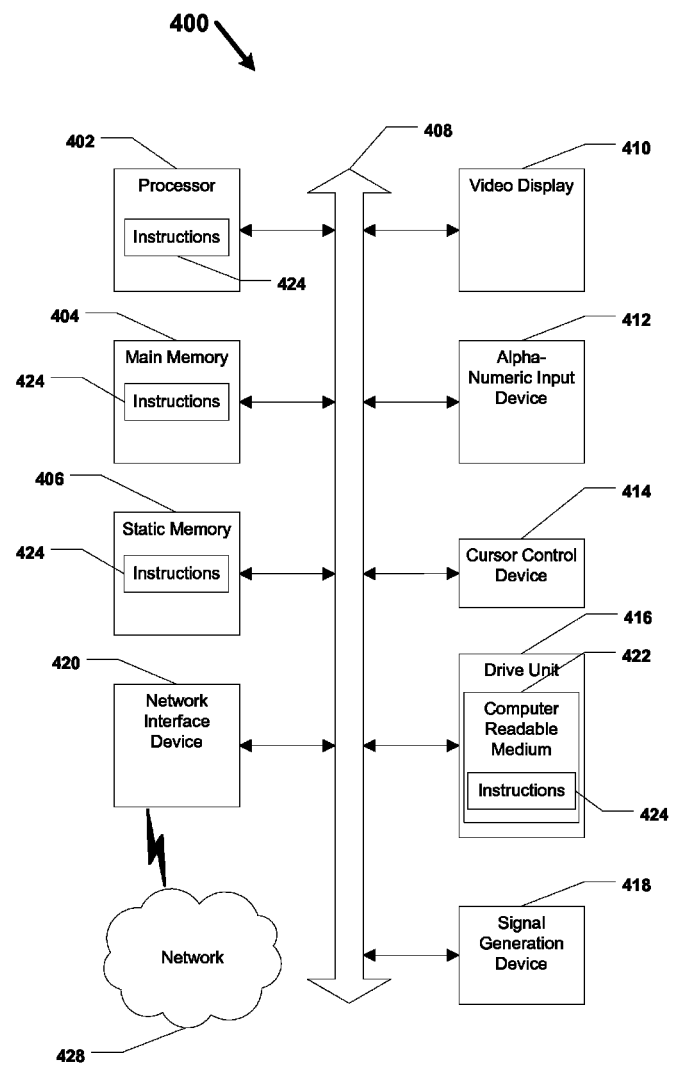
FIG. 4 depicts an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer-based functions disclosed herein. For example, the computer system 400 may include instructions that are executable to perform the methods discussed with respect to FIGS. 2 and 3. In a particular embodiment, the computer system 400 includes instructions to implement the resource manager 164 shown in FIG. 1. In a particular embodiment, the computer system 400 includes instructions to implement the gateway module 114 shown in FIG. 1. In a particular embodiment, the computer system 400 includes or is included within the first computing device 102 shown in FIG. 1. In a particular embodiment, the computer system 400 includes or is included within a set top box. The computer system 400 may be connected to other computer systems or peripheral devices via a network, such as the network 150 shown in FIG. 1. Additionally, the computer system 400 may include or be included within other computing devices.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate via a bus 408. As shown, the computer system 400 may further include a video display unit 410, such as a liquid crystal display (LCD), a projection television display, a flat panel display, a plasma display, or a solid state display. Additionally, the computer system 400 may include an input device 412, such as a remote control device having a wireless keypad, a keyboard, a microphone coupled to a speech recognition engine, a camera such as a video camera or still camera, or a cursor control device 414, such as a mouse device. The computer system 400 can also include a disk drive unit 416, a signal generation device 418, such as a speaker, and a network interface device 420. The network interface 420 enables the computer system 400 to communicate with other systems via a network 426. For example, in particular embodiments the computer system 400 includes or is included within a set top box. The network interface 420 may enable the set top box to communicate with a service-provider system, such as the service-provider system 160 shown in FIG. 1, and may receive multimedia content to display on a display screen, such as the display device 116 shown in FIG. 1. The network interface 420 may include a wireless communication device, such as a device utilizing Bluetooth or a device based on IEEE 802.11 technology.

In a particular embodiment, as depicted in FIG. 4, the disk drive unit 416 may include a computer-readable storage medium 422 in which one or more sets of instructions 424, e.g. software, can be embedded. For example, one or more modules, such as the gateway module 114 or the resource manager 164 shown in FIG. 1, also can be embedded in the computer-readable storage medium 422. Further, the instructions 424 may embody one or more of the methods, such as the methods described with respect to FIGS. 2 and 3, or logic as described herein. In a particular embodiment, the instructions 424 may reside completely, or at least partially, within the main memory 404, the static memory 406, and/or within the processor 402 during execution by the computer system 400. The main memory 404 and the processor 402 also may computer-readable storage media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any medium that is capable of storing or encoding a set of instructions for execution by a processor or that cause a computer system to perform any one or more of the methods or operations disclosed herein.

In a particular non-limiting, exemplary embodiment, the computer-readable storage medium can include a solid-state memory such as a memory card or other package that houses one or more non-volatile read-only memories. Further, the computer-readable storage medium can be a random access memory or other volatile re-writable memory. Additionally, the computer-readable storage medium can include a magneto-optical or optical medium, such as a disk or tapes or other storage device to capture and store a signal communicated over a transmission medium. Accordingly, the disclosure is considered to include any one or more of a computer-readable storage medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the true scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving identification information from a portable device when the portable device is within a coverage area of a local network;
determining whether a first condition is satisfied based on the identification information, wherein the first condition is satisfied when a resource associated with the portable device is permitted by a service provider system to be made available via the local network, wherein the resource is unavailable to a plurality of first computing devices within the coverage area of the local network prior to the portable device entering the coverage area of the local network, wherein the resource is available to the portable device prior to the portable device entering the coverage area of the local network, and wherein the resource is remote to the portable device and remote to the local network;
determining whether a second condition is satisfied, wherein the second condition is satisfied when the resource is permitted by the portable device to be made available via the local network;
determining whether a third condition is satisfied, wherein the third condition is satisfied when access control information is received from an authentication device in the local network, the access control information indicating that access to the resource is permitted via the local network;
in response to the first, second, and third conditions being satisfied, making the resource available to the plurality of first computing devices while the plurality of first computing devices are within the coverage area of the local network; and
in response to at least one of the first, second, and third conditions not being satisfied, restricting access to the resource by the plurality of first computing devices.

2. The method of claim 1, further comprising sending a confirmation-request message to the portable device, wherein the confirmation-request message includes a request for a confirmation that the resource is permitted by the portable device to be made available via the local network.

3. The method of claim 2, wherein the confirmation-request message identifies a plurality of resources associated with the portable device, and wherein the confirmation includes information selecting the resource.

4. The method of claim 1, wherein determining that the resource associated with the portable device is permitted by the service provider system to be made available via the local network includes determining that the resource is included in a first list of resources that are permitted by the service provider system to be made available via the local network, that the resource is excluded from a second list of resources that are not permitted by the service provider system to be made available via the local network, or both.

5. The method of claim 4, wherein the resources on the second list of resources are available to the portable device via one or more external networks prior to the portable device entering the coverage area of the local network.

6. The method of claim 1, wherein the service provider system is accessible to the portable device prior to the portable device entering the coverage area of the local network.

7. The method of claim 1, wherein the local network and the portable device are associated with the service provider system, wherein the service provider system is accessible to plurality of first computing devices within the coverage area of the local network prior to the portable device entering the coverage area of the local network.

8. The method of claim 7, wherein the service provider system includes an Internet Protocol television system.

9. The method of claim 1, wherein the resource is a subscription service and wherein making the resource available via the local network comprises enabling access to the subscription service via the local network.

10. The method of claim 1, wherein the resource is an electronic file and wherein making the resource available via the local network comprises enabling access to the electronic file by the plurality of first computing devices.

11. The method of claim 1, further comprising identifying a plurality of resources associated with the portable device.

12. The method of claim 11, wherein the plurality of resources includes multimedia content stored at a storage device associated with the portable device.

13. A non-transitory computer-readable storage medium comprising computer-executable instructions to cause a processor to:
receive identification information from a portable device when the portable device is within a coverage area of a local network;
determine whether a first condition is satisfied based on the identification information, wherein the first condition is satisfied when a resource associated with the portable device is permitted by a service provider system to be made available via the local network, wherein the resource is unavailable to a plurality of first computing devices within the coverage area of the local network prior to the portable device entering the coverage area of the local network, wherein the resource is available to the portable device prior to the portable device entering the coverage area of the local network, and wherein the resource is remote to the portable device and remote to the local network;
determine whether a second condition is satisfied, wherein the second condition is satisfied when the resource is permitted by the portable device to be made available via the local network;
determine whether a third condition is satisfied, wherein the third condition is satisfied when access control information is received from an authentication device in the local network, the access control information indicating that access to the resource is permitted via the local network;
in response to the first, second, and third conditions being satisfied, make the resource available to the plurality computing devices while the plurality of first computing devices are within the coverage area of the local network; and
in response to at least one of the first, second, and third conditions not being satisfied, restricting access to the resource by the plurality of first computing devices.

14. The non-transitory computer-readable storage medium of claim 13, wherein the local network and the portable device are associated with the service provider system, and wherein the resource is a subscription service provided by the service provider system.

15. The non-transitory computer-readable storage medium of claim 13, wherein the computer-readable storage medium is associated with a set-top box that includes the processor, and wherein the portable device is a mobile telephony device.

16. A computing device comprising:
a network interface to enable communication via a local network;
a proximity detector to determine whether a portable device is located within a coverage area of the local network; and a gateway module coupled to the proximity detector to:
communicate with the portable device when the portable device is located within the coverage area of the local network to determine identification information associated with the portable device;
receive an authentication message from a resource manager based on the identification information, wherein the authentication message indicates whether a first condition, a second condition, and a third condition are satisfied, wherein the first condition is satisfied when a resource associated with the portable device is permitted by a service provider system to be made available via the local network, wherein the second condition is satisfied when the resource is permitted by the portable device to be made available via the local network, wherein the third condition is satisfied when an authentication device in the local network indicates that access to the resource is permitted via the local network, wherein the resource is unavailable to a plurality of computing devices within the coverage area of the local network prior to the portable device entering the coverage area of the local network, wherein the resource is available to the portable device prior to the portable device entering the coverage area of the local network, and wherein the resource is remote to the portable device and remote to the local network;

in response to determining that the first, second, and third conditions are satisfied, send access control information to the resource manager, wherein the access control information indicates that access to the resource is permitted via the local network; and in response to determining that at least one of the first, second, and third conditions are not satisfied, send the access control information to the resource manager, wherein the access control information indicates that access to the resource is not permitted via the local network.

17. The computing device of claim 16, wherein the computing device is designated by a user of the computing device to receive the authentication message.

18. The computing device of claim 16, wherein the computing device includes a set-top box configured to display the authentication message at a display coupled to the set-top box.

19. The computing device of claim 16, wherein the gateway module is configured to make the resource unavailable at the computing device when the portable device leaves the coverage area of the local network.

20. The method of claim 1, wherein the resource comprises a gaming device, a camera, or any combination thereof.

* * * * *